United States Patent
Tanoi

(10) Patent No.: US 6,211,902 B1
(45) Date of Patent: Apr. 3, 2001

(54) VIDEO CONFERENCE CONTROL APPARATUS, VIDEO CONFERENCE CONTROL METHOD, AND VIDEO CONFERENCE CONTROL SYSTEM

(75) Inventor: Toshiyuki Tanoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/201,242

(22) Filed: Nov. 30, 1998

(30) Foreign Application Priority Data

Nov. 28, 1997 (JP) .................................................. 9-329331

(51) Int. Cl.$^7$ ...................................................... H04N 7/14
(52) U.S. Cl. ................. 348/14.09; 348/14.1; 348/14.1 L
(58) Field of Search ........................ 348/14, 15; 345/330, 345/342, 331, 332

(56) References Cited

U.S. PATENT DOCUMENTS 5,953,050 * 9/1999 Kamata et al. ......................... 348/15

FOREIGN PATENT DOCUMENTS

| 2-5690 | 1/1990 | (JP) . |
|---|---|---|
| 4-156084 | 5/1992 | (JP) . |
| 4-177993 | 6/1992 | (JP) . |
| 6-6472 | 1/1994 | (JP) . |
| 6-70040 | 3/1994 | (JP) . |
| 7-30875 | 1/1995 | (JP) . |
| 7-95553 | 4/1995 | (JP) . |

* cited by examiner

Primary Examiner—Curtis Kuntz
Assistant Examiner—Melur Ramakrishnaiah
(74) Attorney, Agent, or Firm—Ostrolenk, Faber, Gerb & Soffen, LLP

(57) ABSTRACT

A video conference control apparatus includes a decoding circuit, a thinning circuit, an image synthesizing circuit, an encoding circuit, and an encoding area setting circuit. The decoding circuit decodes terminal images received from a plurality of video conference terminals. The thinning circuit thins the terminal images decoded by the decoding circuit. The image synthesizing circuit multiplexes the terminal images thinned by the thinning circuit on a predetermined image frame, thereby generating a synthesized image. The encoding circuit encodes the synthesized image generated by the image synthesizing circuit. The encoding area setting circuit sets encoding areas while making the boundary between the encoding areas coincide with the boundary between corresponding divided window areas. A video conference control method and video conference control system are also disclosed.

17 Claims, 4 Drawing Sheets

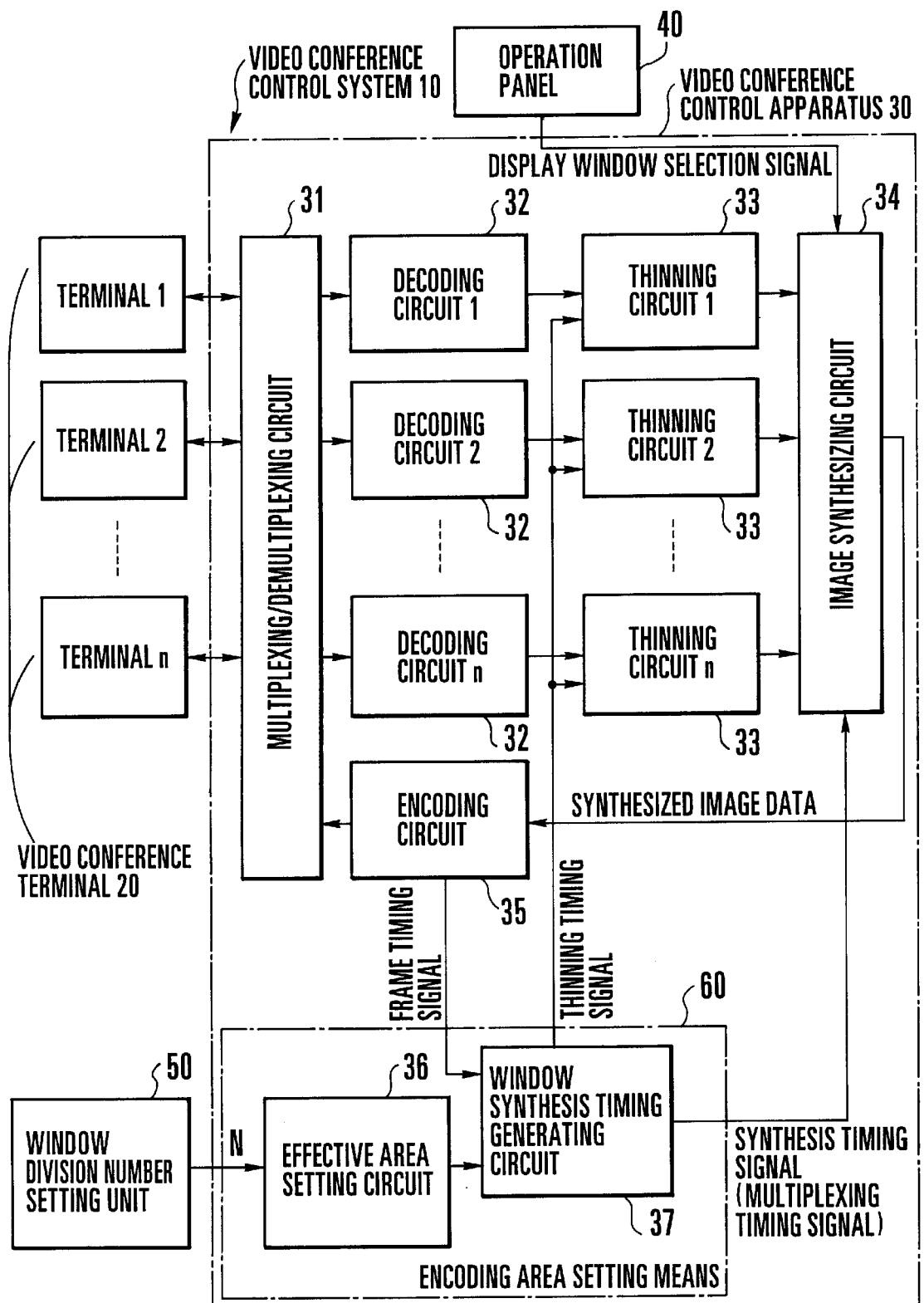
F I G. 1

VIDEO CONFERENCE CONTROL APPARATUS, VIDEO CONFERENCE CONTROL METHOD, AND VIDEO CONFERENCE CONTROL SYSTEM

BACKGROUND OF THE INVENTION

The present invention relates to a video conference control apparatus, video conference control method, and video conference control system.

Conventionally in an MCU (MicroControl Unit) having a window synthesis function, image data from respective terminals are decoded, and the decoded data are reduced in accordance with the window division number. At the same time, synthesized image data obtained by window division and multiplexing is encoded again, and the encoded data is output as a synthesized window to the respective terminals.

FIG. 4 shows an example of a video conference control system having this window synthesis function. Note that FIG. 4 shows only image synthesis, and all the functions about an audio system are not illustrated.

A video conference control system 100 is constituted by n video conference terminals 200 and a video conference control apparatus 300 connected to the video conference terminals 200 via a network. The video conference control apparatus 300 synthesizes transmitted images from the video conference terminals 200 and distributes the synthesized image to the video conference terminals 200.

The video conference terminal 200 is a video conference terminal complying with, e.g., ITU (International Telecommunication Union)-T_H. 320. In this case, encoding/decoding complying with ITU-T_H. 261 is performed.

The video conference control apparatus 300 connected to the video conference terminals 200 via a network using n lines has a window synthesis function. An encoding circuit 350 and a decoding circuit 320 must also comply with ITU-T_H. 261. The following example is based on encoding/decoding complying with ITU-T_H. 261.

An image transmitted from each video conference terminal 200 is demultiplexed into image data, audio data, and other data by a multiplexing/demultiplexing circuit 310 of the video conference control apparatus 300.

The terminal image data demultiplexed by the multiplexing/demultiplexing circuit 310 is decoded by the decoding circuit 320. The decoded data is thinned to 1/N in the horizontal and vertical directions and reduced to 1/N of one frame in accordance with the window division number by a thinning circuit 330 on the basis of a thinning timing signal. The resultant data is output as divided image data to an image synthesizing circuit 340.

The image synthesizing circuit 340 selects divided window data selected by a display window selection signal from respective divided image data, synthesizes (multiplexes) N windows on the basis of a synthesis timing signal (multiplexing timing signal), and outputs the N windows as synthesized image data to the encoding circuit 350.

The encoding circuit 350 compresses and encodes the synthesized image data as one image frame, and distributes the synthesized window to each video conference terminal 200 via the multiplexing/demultiplexing circuit 310. At the same time, the encoding circuit 350 outputs a compression/encoding frame timing signal to a window synthesis timing generating circuit 360.

The window synthesis timing generating circuit 360 outputs the frame timing signal, the thinning timing signal corresponding to a set window division number N, and the synthesis timing signal.

A video conference control apparatus having almost the same arrangement as that of the video conference control apparatus 300 is disclosed in Japanese Patent Laid-Open No. 2-5690.

In the conventional video conference control apparatus 300, the image quality may visually degrade near the boundary between divided windows.

FIG. 5 shows a display window when divided image data corresponding to the respective video conference terminals 200 are synthesized and displayed by the image synthesizing circuit 340.

In FIG. 5, one effective frame area represents an image data area actually encoded by the encoding circuit 350. This area is a unit for controlling encoding characteristics (e.g., quantization characteristics) in accordance with the information generation amount of an image in 352 pixels×288 lines in compliance with ITU-T_H. 261, and corresponds to a macroblock (16 pixels×16 lines: FCIF format) in compliance with ITU-T_H. 261. Note that FIG. 5 exemplifies a display window for the set window division number N=16.

In this case, since divided window areas are simply set in accordance with the window division number N=16, an area where the boundary between divided window areas does not always coincide with the boundary between encoding control blocks exists.

Near such a boundary between divided windows, e.g., a divided window having a large change in motion and coarse quantization characteristics and a divided window having a small change in motion and fine quantization characteristics are processed as the same encoding control block. For this reason, the image quality of the divided window having a small change in motion and fine quantization characteristics greatly degrades.

Also in the video conference control apparatus disclosed in Japanese Patent Laid-Open No. 2-5690, the image quality may visually degrade near the boundary between divided windows.

SUMMARY OF THE INVENTION

The present invention has been made to solve the above problem, and has as its object to provide a video conference control apparatus, video conference control method, and video conference control system capable of preventing visual degradation of the image quality near the boundary between divided windows.

To achieve the above object, according to the present invention, there is provided a video conference control apparatus comprising decoding means for decoding terminal images received from a plurality of video conference terminals, thinning means for thinning the terminal images decoded by the decoding means, image synthesizing means for multiplexing the terminal images thinned by the thinning means on a predetermined image frame, thereby generating a synthesized image, encoding means for encoding the synthesized image generated by the image synthesizing means, and encoding area setting means for setting encoding areas while making a boundary between the encoding areas coincide with a boundary between corresponding divided window areas.

BRIEF DESCRIPTION OF THE DRAWING

FIG. 1 a block diagram showing the arrangement of a multipoint video conference control system according to the present invention;

DESCRIPTION OF THE PREFERRED EMBODIMENT

Figure 2:
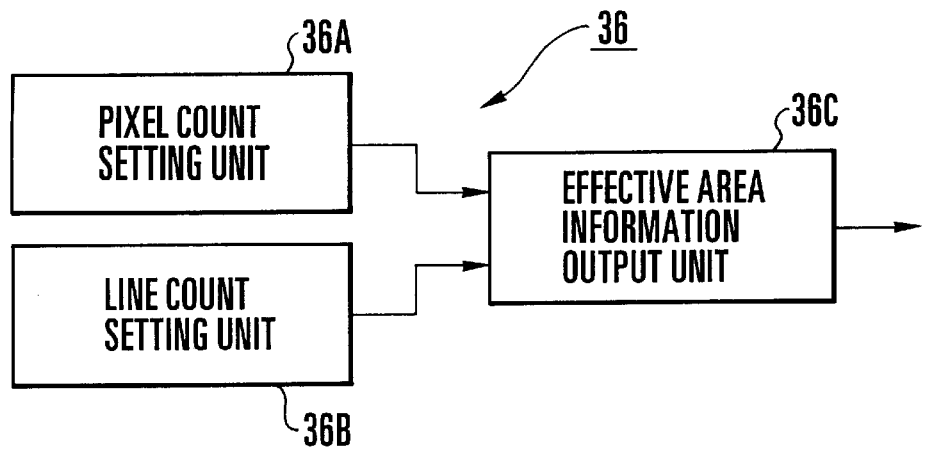
FIG. 2 is a block diagram showing the internal arrangement of an effective area setting circuit in the video conference control apparatus of the video conference control system.

An embodiment of the present invention will be described below with reference to the accompanying drawings.

FIG. 1 shows the arrangement of a multipoint video conference control system according to the present invention.

A multipoint video conference control system 10 is constituted by n video conference terminals 20 and a video conference control apparatus 30 connected to the video conference terminals 20 via a network. The video conference control apparatus 30 synthesizes data transmitted from the video conference terminals 20 and distributes the synthesized data to the video conference terminals 20.

Each video conference terminal 20 complies with ITU-T_H. 320 and is connected to the video conference control apparatus 30. When the video conference terminal 20 transmits data complying with ITU-T_H. 320, the video conference control apparatus 30 performs encoding/decoding complying with ITU-T_H. 261.

In practice, the video conference control apparatus 30 performs data processing for terminal image data, terminal audio data, and the like. For the sake of descriptive simplicity, only data processing for image data will be explained, and a description of another data processing for audio data or the like will be omitted.

The video conference control apparatus 30 comprises a multiplexing/demultiplexing circuit 31 for demultiplexing terminal data transmitted from the respective video conference terminals 20 into terminal image data, terminal audio data, and the like and multiplexing synthesized image data based on the terminal image data, synthesized audio data, and the like, a decoding circuit 32 for decoding the terminal image data, a thinning circuit 33 for thinning the decoded terminal image data, an image synthesizing circuit 34 for synthesizing the thinned terminal image data (divided image data) and outputting the synthesized image data, and an encoding circuit 35 for compressing and encoding the synthesized image data.

With this arrangement, terminal data transmitted from the video conference terminals 20 are demultiplexed into terminal image data, terminal audio data, and the like, and the terminal image data are decoded. Divided image data obtained by thinning are synthesized, and the synthesized image data is output. The synthesized image data is compressed and encoded, multiplexed with synthesized audio data and the like, and distributed to the video conference terminals 20.

The video conference control apparatus 30 also comprises an effective area setting circuit 36 and window synthesis timing generating circuit 37 for outputting various control signals such as a thinning timing signal and synthesis timing signal used in thinning the terminal image data and synthesizing the divided image data.

The video conference control apparatus 30 has a window arrangement function. The decoding circuit 32 and encoding circuit 35 must also comply with ITU-T_H. 261. The following description is based on encoding/decoding complying with ITU-T_H. 261 though the same concept can also be applied to another encoding scheme.

The multiplexing/demultiplexing circuit 31 is connected to the video conference terminals 20 via a network. The multiplexing/demultiplexing circuit 31 demultiplexes terminal data transmitted from the video conference terminals 20 into terminal image data, terminal audio data, and the like. In addition, the multiplexing/demultiplexing circuit 31 multiplexes synthesized image data, synthesized audio data, and the like on the basis of the terminal data, and distributes the resultant data to the video conference terminals 20.

The decoding circuits 32 equal in number to the video conference terminals 20 are connected to the multiplexing/demultiplexing circuit 31, and decode terminal image data corresponding to the video conference terminals 20.

Each thinning circuit 33 is connected to a corresponding decoding circuit 32. The thinning circuit 33 thins data to 1/N in the horizontal and vertical directions in accordance with the window division number N on the basis of a thinning timing signal output from the window synthesis timing generating circuit 37, and outputs divided image data reduced to 1/N of one frame.

The image synthesizing circuit 34 is connected to the respective thinning circuits 33. The image synthesizing circuit 34 selects desired divided image data from divided image data from the thinning circuits 33 on the basis of a display window selection signal, synthesizes (multiplexes) N divided windows on the basis of a synthesis timing signal (multiplexing timing signal) output from the window synthesis timing generating circuit 37, and outputs the synthesized image data.

The display window selection signal is output from an operation panel 40 when the user wants to select images to be simultaneously displayed on the operation panel 40. In this embodiment, a display window is selected in accordance with settings by the user. However, the present invention is not limited to this arrangement, and a video conference terminal 20 in use can be automatically selected to display its data.

Although the image synthesizing circuit 34 generates one synthesized image data, synthesized data based on the same synthesized image data is not always distributed to the video conference terminals 20. The image synthesizing circuit 34 can generate a plurality of types of synthesized image data in order to output different synthesized image data to the video conference terminals 20.

The encoding circuit 35 is connected between the image synthesizing circuit 34 and multiplexing/demultiplexing circuit 31, and compresses and encodes the synthesized image data from the image synthesizing circuit 34 as one image frame. The encoding circuit 35 outputs a compression/encoding frame timing signal.

The effective area setting circuit 36 is connected to the window synthesis timing generating circuit 37. The effective area setting circuit 36 adjusts the effective pixel area of the whole frame in accordance with the window division number N from a window division number setting unit 50 so as to make all the boundaries between divided window areas coincide with the boundaries between encoding control blocks, and outputs effective area information.

FIG. 2 shows the internal arrangement of the effective area setting circuit 36. The effective area setting circuit 36 comprises a pixel count setting unit 36A for setting an effective number of pixels within the image frame, a line count setting unit 36B for setting an effective number of lines within the image frame, and an effective area information output unit 36C for outputting effective area information based on an area designated by the numbers of pixels and lines set by the pixel count setting unit 36A and line count setting unit 36B.

The window synthesis timing generating circuit 37 is connected between the thinning circuits 33, image synthesizing circuit 34, encoding circuit 35, and effective area setting circuit 36. The window synthesis timing generating circuit 37 outputs a thinning timing signal and synthesis timing signal based on the effective area information output from the effective area setting circuit 36 and the window division number N in response to the frame timing signal from the encoding circuit 35.

Figure 3:
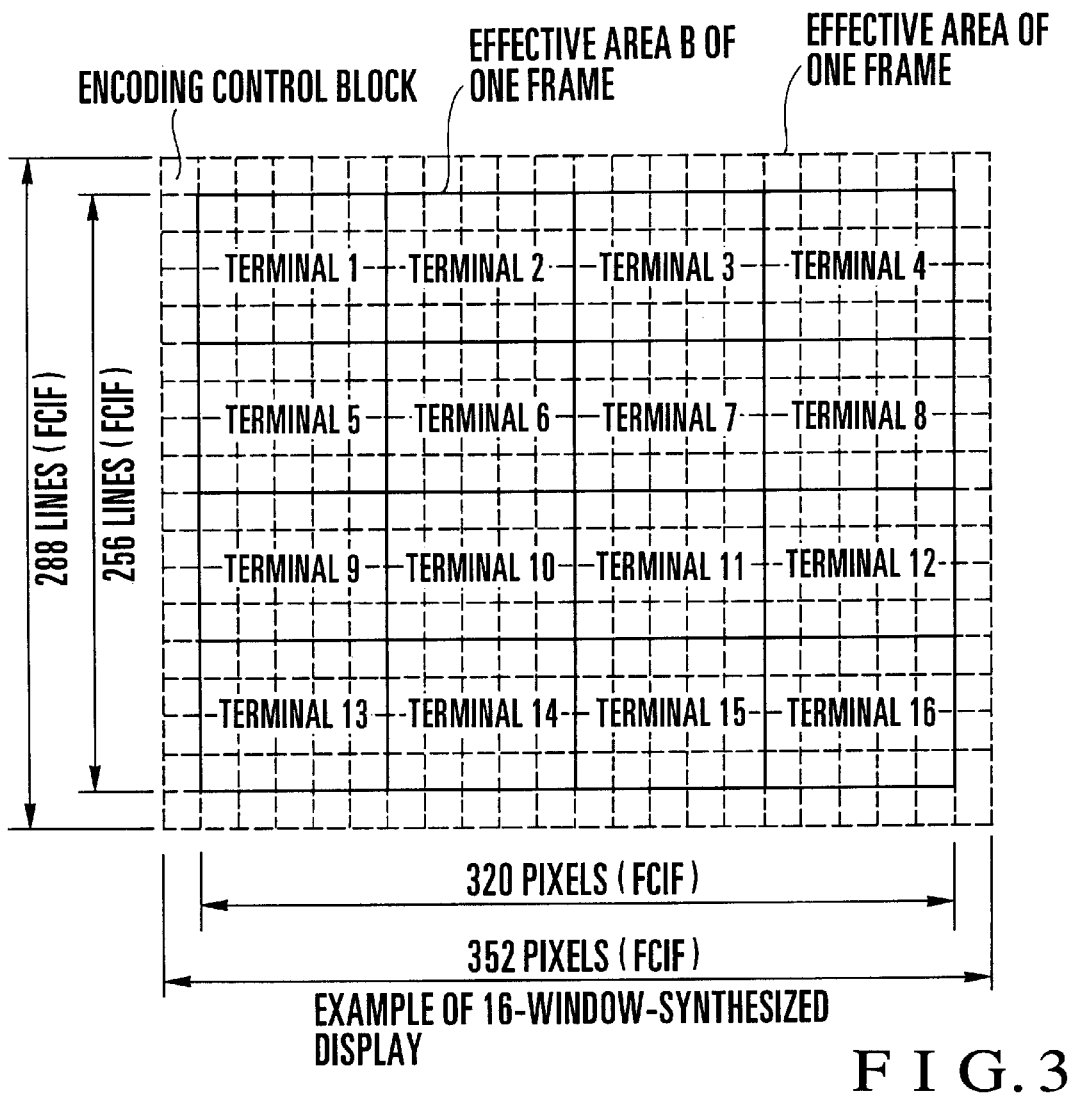
FIG. 3 is a view showing the relationship between divided window areas and encoding control blocks.
Figure 4:
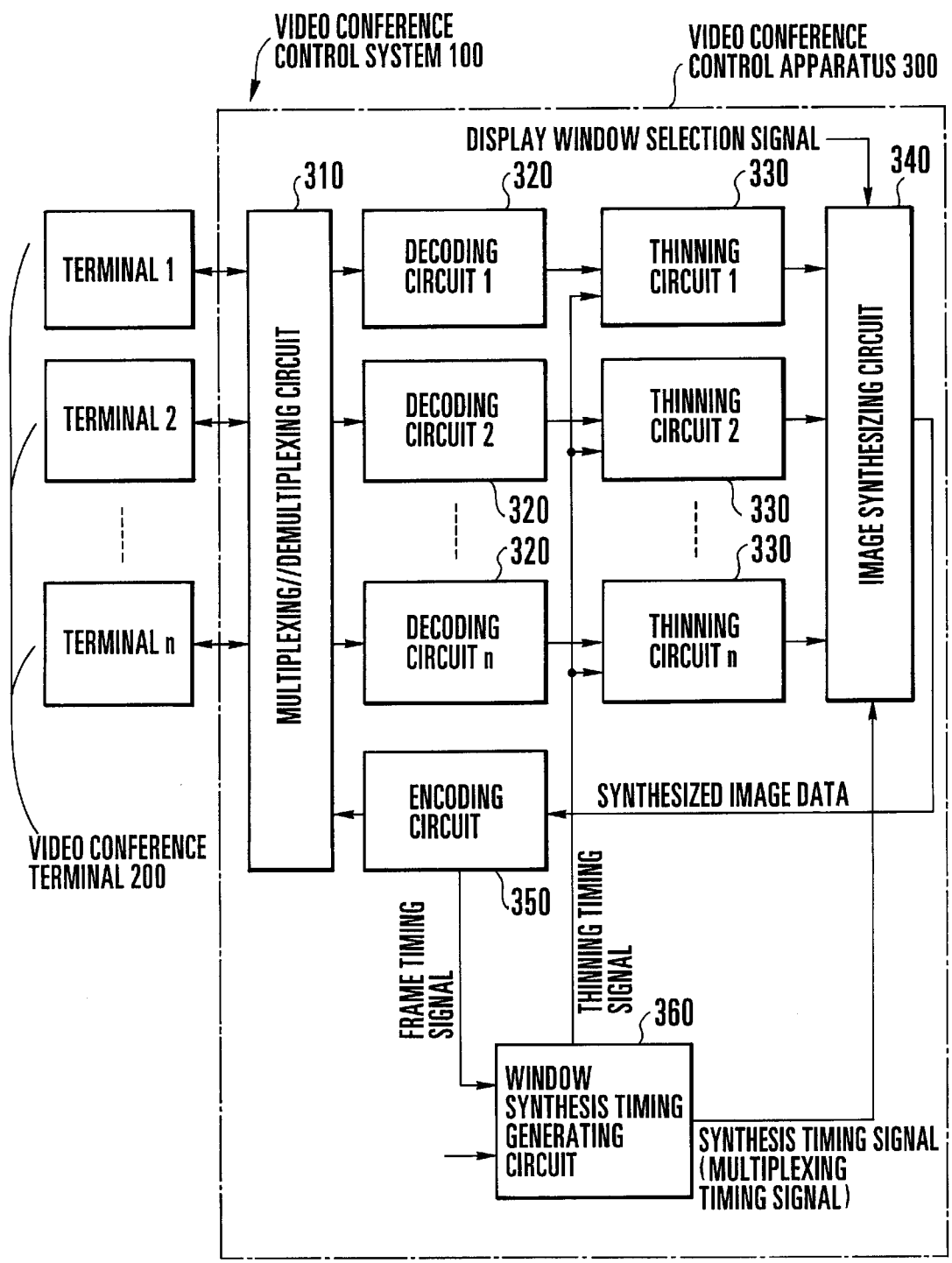
FIG. 4 is a block diagram showing the arrangement of a conventional video conference control system.
Figure 5:
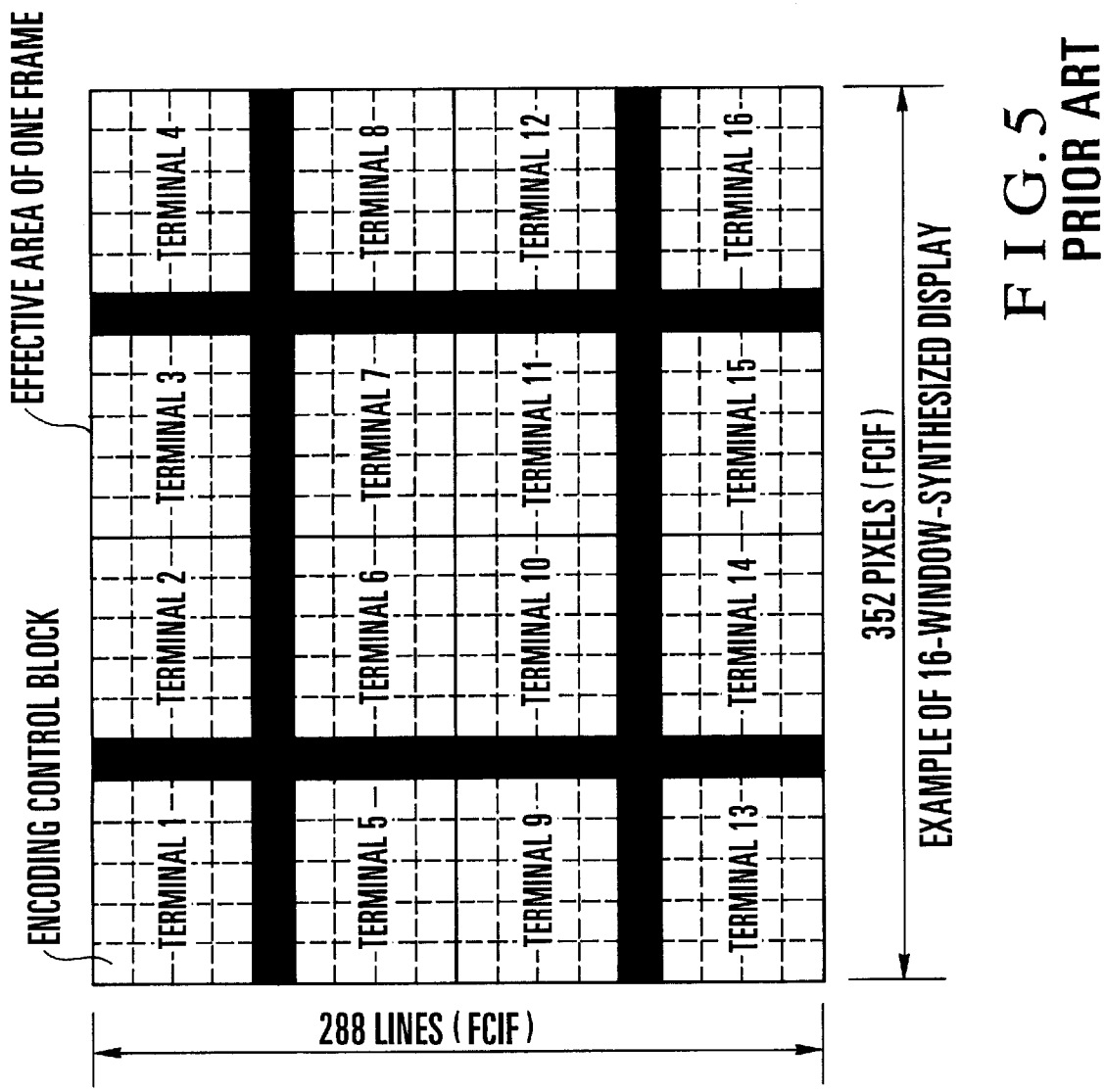
FIG. 5 is a view showing the relationship between conventional divided window areas and encoding control blocks.

FIG. 3 shows an example of a synthesized window display when the effective pixel area per frame is adjusted in displaying 16 divided/synthesized windows on the basis of transmitted data from 16 video conference terminals 20.

In the FCIF format complying with ITU-T_H. 261, the effective pixel area of one frame is made up of 352 pixels× 288 lines. If this effective pixel area is simply divided into 16 on the basis of the window division number N=16, an area where the boundary between divided windows overlaps the encoding control block is formed.

For the window division number N=16, therefore, the effective area setting circuit 36 adjusts the effective pixel area as an effective pixel area B of one frame (320 pixels× 256 lines in the FCIF format complying with ITU-T_H. 261) so as to make the boundary between divided window areas coincide with the boundary between encoding control blocks. That is, the effective area setting circuit 36 makes the boundary between divided window areas coincide with the boundary between encoding control blocks by adjusting the divided window thinning timing (thinning timing) and multiplexing timing (synthesis timing) in accordance with the effective area B of one frame image.

In this sense, the effective area setting circuit 36 for setting the effective area so as to make the boundary between divided window areas coincide with the boundary between encoding control blocks and outputting the effective area information, and the window synthesis timing generating circuit 37 for outputting the synthesis timing signal and the like on the basis of the effective area information from the effective area setting circuit 36 and the like constitute an encoding area setting means 60.

Operation of the multipoint video conference control system 10 according to this embodiment will be explained.

The user sets on the operation panel 40 the video conference terminals 20 to be simultaneously displayed. When the video conference terminals 20 transmit terminal data to the video conference control apparatus 30, the multiplexing/ demultiplexing circuit 31 demultiplexes the terminal data into terminal image data, terminal audio data, and the like. The decoding circuits 32 decode the terminal image data, and the thinning circuits 33 thin the decoded data on the basis of the thinning timing signal.

The image synthesizing circuit 34 synthesizes the thinned terminal image data on the basis of the synthesis timing signal, and outputs the synthesized image data. When the encoding circuit 35 compresses and encodes the synthesized image data as one image frame, the multiplexing/ demultiplexing circuit 31 multiplexes the synthesized image data compressed and encoded with synthesized audio data and the like, and distributes the resultant data to the video conference terminals 20.

On each video conference terminal 20, the terminal image data from the video conference terminals 20 set by the user on the operation panel 40 are simultaneously displayed.

In this manner, terminal image data transmitted from the video conference terminals 20 are synthesized as windows, compressed, encoded, and distributed to the video conference terminals 20, while the effective area is set to make the boundary between divided window areas coincide with the boundary between encoding control blocks. Accordingly, visual degradation of the image quality near the boundary between divided windows can be prevented for an image obtained on each video conference terminal 20.

In FIG. 1, since the video conference terminal 20 suffices to transmit a terminal image to the video conference control apparatus 30, it may be connected to the video conference control apparatus 30 via a cable or the like or may transmit a terminal image via a radio wave or the like. In the former case, the video conference terminal 20 may use the Internet, CATV, or telephone line network.

Since the window division number setting unit 50 suffices to set the window division number, it may set a window division number designated by the user or may automatically set the window division number in accordance with the number of video conference terminals 20 whose terminal images are received.

As has been described above, according to the present invention, a video conference control apparatus capable of preventing visual degradation of the image quality near the boundary between divided windows can be provided.

According to the present invention, the thinning timing for thinning the terminal image and the multiplexing timing for multiplexing data can be adjusted to make the boundary between encoding areas and the boundary between corresponding divided windows coincide with each other.

According to the present invention, the effective pixel area of the image frame can be set in accordance with the window division number so as to make all the boundaries between divided window areas coincide with the boundaries between encoding areas, and the thinning timing and multiplexing timing can be adjusted on the basis of the output effective area information.

According to the present invention, effective numbers of pixels and lines within the image frame can be set to output the effective area information based on an area designated by the numbers of pixels and lines.

According to the present invention, a video conference control method capable of preventing visual degradation of the image quality near the boundary between divided windows can be provided, and a video conference control system capable of preventing visual degradation of the image quality near the boundary between divided windows can be provided.

What is claimed is:

1. A video conference control apparatus comprising:

decoding means for decoding terminal images received from a number of video conference terminals;

thinning means for thinning the terminal images decoded by said decoding means in an amount corresponding to said number of video conference terminals;

image sythesizing means for multiplexing the terminal images thinned by said thinning means on a predetermined image frame, thereby generating a synthesized image;

encoding means for encoding the synthesized image generated by said image synthesizing means; and encoding area setting means for setting encoding areas while making a boundary between the encoding areas with a boundary between corresponding divided window areas by adjusting a thinning timing for thinning the terminal images by said decoding means and a multiplexing timing for performing multiplexing by said image synthesizing means.

2. An apparatus according to claim 1, wherein said apparatus further comprises window division number setting means for setting a window division number, and said encoding area setting means comprises effective area setting means for setting an effective pixel area of the image frame in accordance with the window division number so as to make all boundaries between divided window areas coincide with boundaries between encoding areas, and outputting effective area information, and timing generating means for adjusting the thinning timing and the multiplexing timing on the basis of the window division number and the effective area information.

3. An apparatus according to claim 2, wherein said image sythesizing means multiplexes terminal images selected and designated as display windows on a predetermined image frame, thereby generating a synthesized image.

4. An apparatus according to claim 2, wherein said image synthesizing means multiplexes terminal images from automatically selected video conference terminals in use on a predetermined image frame, thereby generating a synthesized image.

5. An apparatus according to claim 2, wherein said image synthesizing means generates a plurality of types of synthesized image data.

6. An apparatus according to claim 2, wherein said effective area setting means comprises pixel setting means for setting an effective number of pixels within the image frame, line count setting means for setting an effective number of lines within the image frame, and effective area information output means for outputting the effective area information on the basis of an area designated by the numbers of pixels and lines set by said pixel setting means and said line count setting means.

7. An apparatus according to claim 6, wherein said image synthesizing means multiplexes terminal images selected and designated as display windows on a predetermined image frame, thereby generating a synthesized image.

8. An apparatus according to claim 6, wherein said image synthesizing means multiplexes terminal images from automatically selected video conference terminals in use on a predetermined image frame, thereby generating a synthesized image.

9. An apparatus according to claim 6, wherein said image synthesizing means generates a plurality of types of synthesized image data.

10. An apparatus according to claim 1, wherein said image synthesizing means multiplexes terminal images selected and designated as display windows on a predetermined image frame, thereby generating a synthesized image.

11. An apparatus according to claim 1, wherein said image synthesizing means multiplexes terminal images from automatically selected video conference terminals in use on a predetermined image frame, thereby generating a synthesized image.

12. An apparatus according to claim 1, wherein said image synthesizing means generates a plurality of types of synthesized image data.

13. An apparatus according to claim 1, wherein said image synthesizing means multiplexes terminal images selected and designated as display windows on a predetermined image frame, thereby generating a synthesized image.

14. An apparatus according to claim 1, wherein said image synthesizing means multiplexes terminal images from automatically selected video conference terminals in use on a predetermined image frame, thereby generating a synthesized image.

15. An apparatus according to claim 1, wherein said image synthesizing means generates a plurality of types of synthesized image data.

16. A video conference control method comprising the steps of:

thinning terminal images obtained from a number of video conference terminals according to the number of video conference terminals;

multiplexing the thinned terminal images on an image frame to output a synthesized image; and encoding the synthesized image while making a boundary between encoding areas coincide with a boundary between corresponding divided window areas by adjusting a thinning timing for thinning the terminal images by a decoding means and a multiplexing timing for performing multiplexing by an image synthesizing means.

17. A video conference control system comprising:

a multipoint video conference control apparatus for thinning terminal images according to a number of terminal images, multiplexing the thinned terminal images on an image frame to output a synthesized image, and encoding the synthesized image to output the encoded image while making a boundary between encoding areas coincide with a boundary between corresponding divided window areas by adjusting a thinning timing for thinning the terminal images by a decoding means and a multiplexing timing for performing multiplexing by an image synthesizing means; and a plurality of video conference terminals which are arranged at multiple points, output the terminal images to said video conference control apparatus, and obtain the encoded image from said video conference control apparatus to simultaneously display images at multiple points.

* * * * *